(12) United States Patent
Son

(10) Patent No.: US 7,471,367 B2
(45) Date of Patent: Dec. 30, 2008

(54) ARRAY SUBSTRATE FOR IN-PLANE SWITCHING MODE LIQUID CRYSTAL DISPLAY DEVICE AND METHOD OF FABRICATING THE SAME

(75) Inventor: Hyeon-Ho Son, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 46 days.

(21) Appl. No.: 11/133,318

(22) Filed: May 20, 2005

(65) Prior Publication Data

US 2005/0259206 A1 Nov. 24, 2005

(30) Foreign Application Priority Data

May 24, 2004 (KR) ...................... 10-2004-0036907

(51) Int. Cl.
*G02F 1/1343* (2006.01)

(52) U.S. Cl. ........................ 349/145; 349/139; 349/141

(58) Field of Classification Search ................. 349/139, 349/141, 145; *G02F 1/1343*
See application file for complete search history.

(56) References Cited

U.S. PATENT DOCUMENTS

| | | | |
|---|---|---|---|
| 6,078,368 A * | 6/2000 | Ichikawa et al. | 349/48 |
| 6,285,431 B2 * | 9/2001 | Lyu et al. | 349/143 |
| 6,377,322 B2 * | 4/2002 | Yamaguchi et al. | 349/42 |
| 6,545,658 B2 * | 4/2003 | Ohta et al. | 349/141 |
| 6,636,289 B2 * | 10/2003 | Yoo et al. | 349/141 |
| 2001/0028424 A1 * | 10/2001 | Maeda | 349/110 |
| 2002/0044249 A1 * | 4/2002 | Hirota | 349/146 |
| 2004/0247798 A1 * | 12/2004 | Ham et al. | 427/551 |
| 2005/0128410 A1 * | 6/2005 | Lee | 349/141 |
| 2005/0140897 A1 * | 6/2005 | Kim | 349/141 |

FOREIGN PATENT DOCUMENTS

| | | |
|---|---|---|
| JP | 11-002837 | 1/1999 |
| JP | 11-125835 | 5/1999 |
| KR | 1020010108836 | 12/2001 |

OTHER PUBLICATIONS

Communication from Japanese Patent Office dated Jan. 25, 2006.

* cited by examiner

*Primary Examiner*—Michael H Caley
(74) *Attorney, Agent, or Firm*—McKenna Long & Aldridge LLP

(57) ABSTRACT

An in-plane switching mode liquid crystal display device includes a substrate; a plurality of gate lines on the substrate, the gate lines having a zigzag shape; a plurality of first common lines between adjacent pairs of the gate lines, the plurality of first common lines having a zigzag shape; a plurality of data lines crossing the gate lines and the first common lines to define a plurality of pixel regions; a thin film transistor connected to one of the gate lines and one of the data lines; a plurality of auxiliary common lines extending from the first common lines, the plurality of auxiliary common lines parallel to the data lines; a plurality of common electrodes extending from the plurality of auxiliary common lines, the plurality of common electrodes parallel to the first common lines; a plurality of pixel lines connected to the thin film transistor; and a plurality of pixel electrodes extending from the plurality of pixel lines, the plurality of pixel electrodes parallel to and alternating with the plurality of common electrodes.

22 Claims, 9 Drawing Sheets

ARRAY SUBSTRATE FOR IN-PLANE SWITCHING MODE LIQUID CRYSTAL DISPLAY DEVICE AND METHOD OF FABRICATING THE SAME

This application claims the benefit of Korean Patent Application No. 2004-0036907, filed in Korea on May 24, 2004, which is hereby incorporated by reference.

BACKGROUND OF THE INVENTION

1. Field of the Invention

The present invention relates to a liquid crystal display device, and more particularly, to an array substrate for in-plane switching mode liquid crystal display device and a method of fabricating the same.

2. Discussion of the Related Art

In general, a liquid crystal display (LCD) device uses the optical anisotropy and polarization properties of liquid crystal molecules to produce an image. Due to the optical anisotropy of the liquid crystal molecules, refraction of light incident onto the liquid crystal molecules depends upon the alignment direction of the liquid crystal molecules. The liquid crystal molecules have long thin shapes that can be aligned along specific directions. The alignment direction of the liquid crystal molecules can be controlled by applying an electric field. Accordingly, the alignment of the liquid crystal molecules changes in accordance with the direction of the applied electric field. Thus, by properly controlling the electric field applied to a group of liquid crystal molecules within respective pixel regions, a desired image can be produced by appropriately refracting the incident light.

There are several types LCD devices, and one of which is commonly referred to as active matrix LCD (AM-LCD) device. The AM-LCD device includes an array of pixels forming a matrix. Each of the pixels in the AM-LCD device includes a thin film transistor (TFT) and a pixel electrode. The AM-LCD devices are currently being developed because of their high resolution and superior quality for displaying moving pictures.

A related art LCD device includes a color filter substrate having a common electrode, an array substrate having a pixel electrode, and a liquid crystal layer interposed between the color filter substrate and the array substrate. In the related art LCD device, the liquid crystal layer is driven by a vertical electric field between the pixel electrode and the common electrode. The related art LCD device provides a superior transmittance and a high aperture ratio. However, the related art LCD device has a narrow viewing angle because it is driven by the vertical electric field. Various other types of LCD devices having wide viewing angles, such as in-plane switching mode (IPS) mode LCD device, have been developed.

FIG. 1 is a schematic cross-sectional view of an IPS mode LCD device according to the related art. Referring to FIG. 1, an upper substrate 9 and a lower substrate 10 face and are spaced apart from each other. A liquid crystal layer 11 is interposed between the upper and the lower substrates. The upper substrate 9 and the lower substrate 10 may be commonly referred to as a color filter substrate and an array substrate, respectively. A common electrode 17 and a pixel electrode 30 are formed on the lower substrate 10. The liquid crystal layer 11 is driven by a lateral electric field "L" between the common electrode 17 and the pixel electrode 30. Since liquid crystal molecules in the liquid crystal layer 11 change directions while maintaining their longitudinal axes in a plane perpendicular to the direct viewing direction of a display, IPS provides a wide viewing angle for the display device. For example, the viewing angle can range from 80 to 85 degrees along vertical and horizontal directions from a line vertical to an IPS-LCD panel.

FIG. 2A is a schematic cross-sectional view of the related art in-plane switching mode liquid crystal display device in an ON state. Referring to FIG. 2A, voltages are applied to a pixel electrode 30 and a common electrode 17 to generate an electric field L having horizontal and vertical portions. In the vertical portion of the electric field L over the pixel electrode 30 and the common electrode 17, first liquid crystal molecules 11a of the liquid crystal layer 11 are not re-aligned the electric field L, and a phase transition of the liquid crystal layer 11 does not occur. In the horizontal portion of the electric field L between the pixel electrode 30 and the common electrode 17, second liquid crystal molecules 11b of the liquid crystal layer 11 are horizontally re-aligned with the electric field L. Thus, a phase transition of the liquid crystal layer 11 occurs in the horizontal portion of the electric field L. Because the liquid crystal molecules are re-aligned with the horizontal portion of the electric field L, the IPS mode LCD device has a wide viewing angle. For example, users can see images having a viewing angle of about 80° to about 85° along top, bottom, right and left directions with respect to a normal direction of the IPS mode LCD device.

FIG. 2B is a schematic cross-sectional view of the related art in-plane switching mode liquid crystal display device in an OFF state. Referring to FIG. 2B, an horizontal electric field is not generated when the IPS mode LCD device is in the OFF state. Thus, liquid crystal molecules 11 are not re-aligned. Thus, a phase transition of the liquid crystal layer 11 does not occur.

FIG. 3 is a plane view of the related art array substrate for an IPS mode LCD device. Referring to FIG. 3, a gate line 12 and a data line 24 crossing each other are formed on a substrate 10. A thin film transistor (TFT) Tr is disposed near each crossing of the gate line 12 and the data line 24. The TFT Tr includes a gate electrode 14, an active layer 20, a source electrode 26 and a drain electrode 28. The source electrode 26 is connected to the data line 24, and the gate electrode 14 is a portion of the gate line 12. A pixel region P is defined by the crossing of the gate line 12 and the data line 24. A plurality of pixel electrodes 30 parallel to the data line 24 is connected to the TFT Tr via a first pixel line 29a connected to the drain electrode 28. The pixel electrodes 30 are also connected to a second pixel line 29b. In addition, a plurality of common electrodes 17 extends from a common line 16 parallel to the gate line 12. The common electrodes 17 are parallel to the data line 24 and alternate with the pixel electrodes 30.

In the related art IPS mode LCD device, however, problems such as a gray inversion may occur. To improve these problems, an IPS mode LCD device having common electrodes and pixel electrodes of a chevron shape has been suggested.

FIG. 4 is a schematic plan view of the related art array substrate for an IPS mode LCD device. Referring to FIG. 4, a gate line 32 and a common line 42 are formed on a substrate 31 in parallel to each other. A data line 50 having a chevron shape crosses the gate line 32 and the common line 42 to define a pixel region. A thin film transistor (TFT) Tr is formed at the crossing of the gate line 32 and the data line 50. In addition, a plurality of common electrodes 45 having a chevron shape extends from the common line 42 in the pixel region. The common electrodes 45 are spaced apart from each other. A plurality of pixel electrodes 62 is disposed in a space between the common electrodes 45. The pixel electrodes 62 also have a chevron shape and are connected to the TFT Tr. The common electrodes 45 are combined by an auxiliary common line 43 to form a closed structure. The common line 42 and the auxiliary common line 43 adjacent to the gate line 32 function as first and second shielding means SA1 and SA2, respectively, which prevent interference with an electric field due to the gate line 32. The pixel electrodes 62 also have a closed structure.

Since the plurality of common electrodes 45 and the plurality of pixel electrodes 62 have a chevron shape, the pixel region may be divided into two portions with different directions for the electric fields generated in these portions. Accordingly, liquid crystal molecules are re-aligned along two different directions in the two portions of the pixel region, thereby forming a two-domain structure. In the two-domain structure, since birefringence is compensated in the two portions, a color shift phenomenon is minimized and an area without a gray inversion is enlarged.

However, in the related art IPS mode LCD device with the chevron-shaped common electrodes and pixel electrodes, the outermost common electrodes 45a and 45b adjacent to the data line 50 have a width cw over 10 μm to minimize a vertical cross-talk phenomenon. Further, the first and second shielding means SA1 and SA2 are required to prevent interference with an electric field due to the gate line 32. As a result, the aperture ratio is reduced.

FIG. 5 is a simulation graph showing transmittance in one pixel region of the related art IPS mode LCD device. As shown in FIG. 5, the related art IPS mode LCD device having the chevron-shaped common electrode and pixel electrodes has another disadvantage. Specifically, an effective transmittance decreases at a bent portion of a pixel electrode or a common electrode, i.e., at a borderline between two domains. Accordingly, the brightness of the IPS mode LCD device is reduced.

FIG. 6 is a schematic plane view of a data line of the related art IPS mode LCD device. Referring to FIG. 6, a data line 50 is disposed along a vertical direction. Common electrodes 45 and a pixel electrode 62 are disposed parallel to the data line 50. The common electrodes 45 are spaced apart from each other and alternate with the pixel electrode 62. An alignment layer for initial orientation of a liquid crystal layer may have an orientation direction having an angle of about 20° with respect to the vertical direction. Accordingly, a long axis of a liquid crystal molecule may be aligned to the orientation direction of the alignment layer.

When a data signal is applied to the pixel electrode 62 through the data line 50, a first electric field "$E_0$" is generated between the pixel electrode 62 and the common electrode 45, and a second electric field "$E_d$" is generated between the data line 50 and the common electrode 45. Since the data line 50 and the pixel electrode 62 are parallel to the common electrode 45, the first electric field "$E_0$" is parallel to the second electric field "$E_d$." Accordingly, a total electric field "E" driving the liquid crystal layer is the summation of the first and second electric fields "$E_0$" and "$E_d$", that is, $E=E_0+E_d$.

To minimize interference with the total electric field "E" due to the second electric field "$E_d$," an outermost common electrode 45 may be formed to have a first width "W1" such that the second electric field "$E_d$" is sufficiently separated from the first electric field "$E_0$." For example, the outermost common electrode 45 may have a first thickness "W1" within a range of about 10 μm to about 15 μm.

SUMMARY OF THE INVENTION

Accordingly, the present invention is directed to an array substrate for in-plane switching mode liquid crystal display device and a method of fabricating the same that substantially obviate one or more of the problems due to limitations and disadvantages of the related art.

An object of the present invention is to provide an array substrate for in-plane switching mode liquid crystal display device having a high aperture ratio.

Another object of the present invention is to provide an array substrate for in-plane switching mode liquid crystal display device having a high brightness.

Another object of the present invention is to provide a method of fabricating an array substrate for in-plane switching mode liquid crystal display device having a high aperture ratio.

Another object of the present invention is to provide a method of fabricating an array substrate for in-plane switching mode liquid crystal display device having a high brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes a substrate; a plurality of gate lines on the substrate, the gate lines having a zigzag shape; a plurality of first common lines between adjacent pairs of the gate lines, the plurality of first common lines having a zigzag shape; a plurality of data lines crossing the gate lines and the first common lines to define a plurality of pixel regions; a thin film transistor connected to one of the gate lines and one of the data lines; a plurality of auxiliary common lines extending from the first common lines, the plurality of auxiliary common lines parallel to the data lines; a plurality of common electrodes extending from the plurality of auxiliary common lines, the plurality of common electrodes parallel to the first common lines; a plurality of pixel lines connected to the thin film transistor; and a plurality of pixel electrodes extending from the plurality of pixel lines, the plurality of pixel electrodes parallel to and alternating with the plurality of common electrodes.

In another aspect, a method of fabricating an in-plane switching mode liquid crystal display device include forming a plurality of gate lines, a plurality of first common lines between adjacent pairs of the gate lines, a plurality of auxiliary common lines extending from the plurality of first common lines and a plurality of common electrodes extending from the plurality of auxiliary common lines on a substrate, wherein the plurality of gate lines and the plurality of first common lines have a zigzag shape, and the common electrodes are parallel to the first common lines; forming a plurality of data lines crossing the plurality of gate lines and the plurality of first common lines to define a plurality of pixel regions, the plurality of data lines parallel to the plurality of auxiliary common lines; forming a thin film transistor connected to one of the gate lines and one of the data lines; and forming a plurality of pixel lines connected to the thin film transistor and a plurality of pixel electrodes extending from the plurality of pixel lines, wherein the pixel electrodes are parallel to and alternate with the common electrodes.

In another aspect, an array substrate for an in-plane switching mode liquid crystal display device includes a first gate line and a second gate line on a substrate, the first and the second gate lines having a zigzag shape and parallel to each other; a first common line between the first and second gate lines, the first common line having a zigzag shape; a plurality of data lines crossing the first and second gate lines and the first common line to define a plurality of pixel regions; a thin film transistor in each of the plurality of pixel regions, the thin film transistor connected to one of the first and second gate lines and one of the data lines; a plurality of auxiliary common lines in each of the plurality of pixel regions, the plurality of auxiliary common lines extending from the first common lines, the plurality of auxiliary common lines parallel to the data lines; a plurality of common electrodes in each of the plurality of pixel regions, the plurality of common electrodes extending from the plurality of auxiliary common lines, the plurality of common electrodes parallel to the first common line; and a plurality of pixel lines in each of the plurality of pixel regions, the plurality of pixel lines connected to the thin film transistor, wherein a first slant angle between the common electrodes and the data lines in a pixel region has the same magnitude as and an opposite direction to a second slant angle between the common electrodes and the data lines in an horizontally adjacent pixel region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, an example of which is illustrated in the accompanying drawings.

Figure 7:
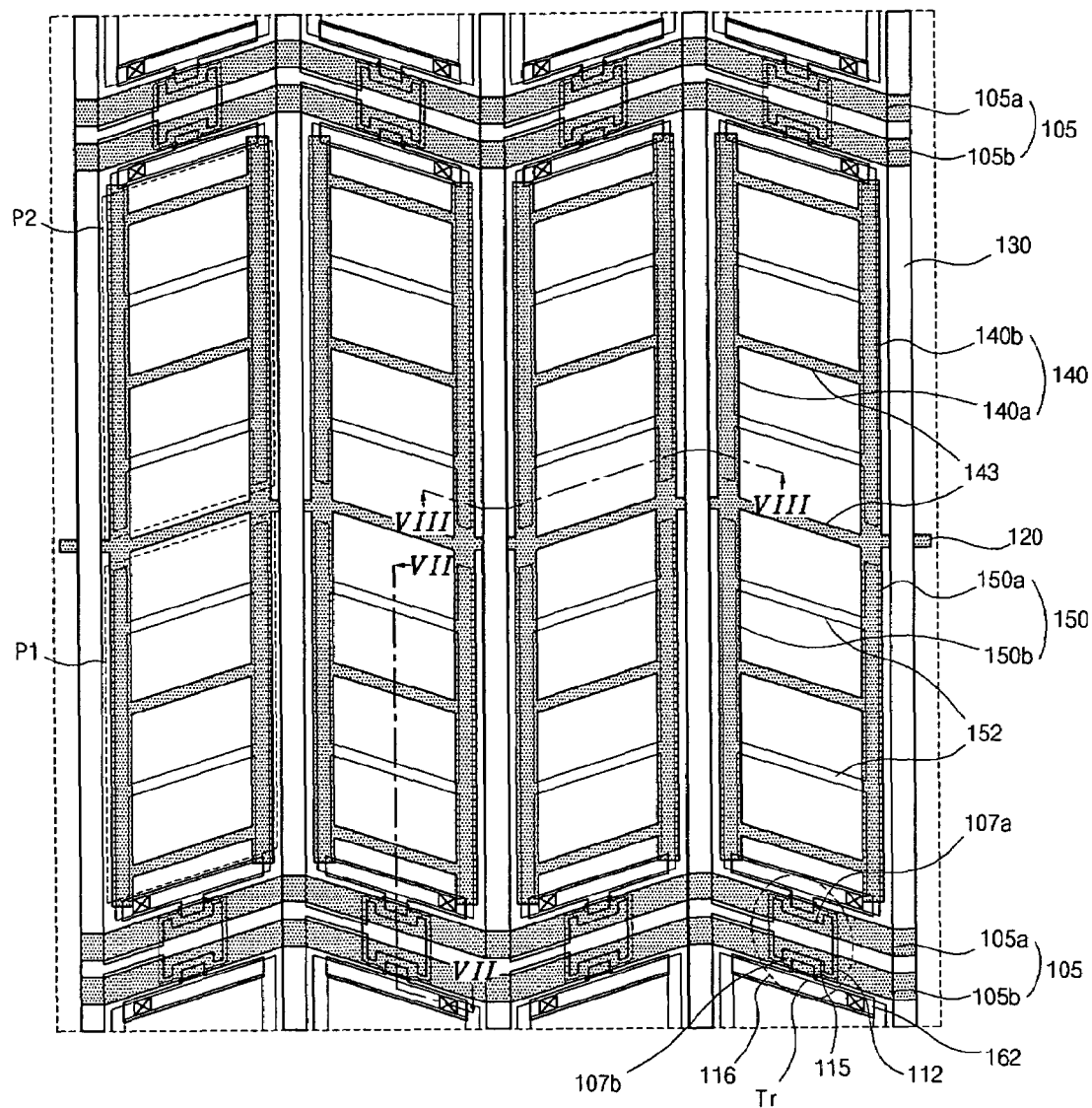
FIG. 7 is a schematic plane view of an exemplary array substrate for an IPS mode LCD device according to an embodiment of the present invention.

FIG. 7 is a schematic plane view of an exemplary array substrate for an IPS mode LCD device according to an embodiment of the present invention. Referring to FIG. 7, first and second gate lines 105a and 105b are formed on a substrate 100. The first and second gate lines 105a and 105b are spaced apart from and parallel to each other. The first and second gate lines 105a and 105b have a zigzag shape. A common line 120, which also has a zigzag shape, is spaced apart from and parallel to the first and second gate lines 105a and 105b. Data lines 130 cross the first and second gate lines 105 and the common line 120 to define first and second pixel regions P1 and P2. The first and second gate lines 105a and 105b form a zigzag pattern along horizontally adjacent pixel regions. Accordingly, slant angles of the first and second gate lines with respect to an horizontal line differ from one pixel region to another horizontally adjacent pixel region.

A thin film transistor (TFT) Tr is formed at a boundary portion of each pixel region P1 and P2. The thin film transistor (TFT) Tr includes a gate electrode 107, a semiconductor layer 112, a source electrode 115 and a drain electrode 116. For example, the TFT Tr may be formed on the first and second gate lines 105a and 105b such that portions of the first and second gate lines 105a and 105b function as a gate electrode. The source electrode 115 is connected to the data line 130.

The first gate line 105a and the corresponding TFT Tr are disposed at a lower portion of the first pixel region P1. The second gate line 105b and the corresponding TFT Tr are disposed at an upper portion of the second pixel region P2. An odd gate (not shown) line and an odd TFT (not shown) may be disposed at a lower portion of an odd pixel region throughout the entire display region of the IPS mode LCD device. An even gate line (not shown) and an even TFT (not shown) may be disposed at a upper portion of an even pixel region throughout the entire display region of the IPS mode LCD device.

An auxiliary common line 140 is disposed in each of the first and second pixel regions P1 and P2. The auxiliary common line 140 is connected to the common line 120. A plurality of common electrodes 143 spaced apart from each other are connected to the auxiliary common line 140. For example, the auxiliary common line 140 may include first and second auxiliary common lines 140a and 140b spaced apart from each other and perpendicularly extending from the common line 120. The plurality of common electrodes 143 may extend from the first and second auxiliary common lines 140a and 140b in parallel to the common line 120. The common line 120 may function as one common electrode at a border portion between the first and second pixel regions P1 and P2. The auxiliary common line 140 spaced apart from the data line 130 may have a width within a range of about 5 μm to about 10 μm.

A pixel line 150 is also disposed in each of the first and second pixel regions P1 and P2. In addition, the pixel line 150 overlaps the auxiliary common line 140 and is connected to the TFT Tr. A plurality of pixel electrodes 152 alternating with the plurality of common electrodes 143 is connected to the pixel line 150. The pixel electrodes 152 extend from the pixel line 150 and are parallel to the common electrodes 143. Thus, the pixel electrodes 152 are parallel to the common line 120. For example, the pixel line 150 may include first and second pixel lines 150a and 150b respectively overlapping the first and second auxiliary common lines 140a and 140b. The pixel electrodes 152 may be connected to each other through the first and second pixel lines 150a and 150b. The auxiliary common lines 140 in the first and second pixel regions P1 and P2 are connected to each other to receive a common voltage. In contrast, the pixel lines 150 in the first and second pixel regions P1 and P2 are disconnected from each other to define the different first and second pixel regions P1 and P2.

Since the plurality of common electrodes 143 and the plurality of pixel electrodes 152 are parallel to the common line 120, which has a zigzag shape, common electrodes 143 in horizontally adjacent pixel regions have different slant angles with respect to an horizontal line. Similarly, pixel electrodes 152 in horizontally adjacent pixel regions have different slant angles with respect to an horizontal line. Accordingly, the horizontally adjacent pixel regions define different domains and form a multi-domain structure throughout the entire IPS mode LCD device.

Figure 8:
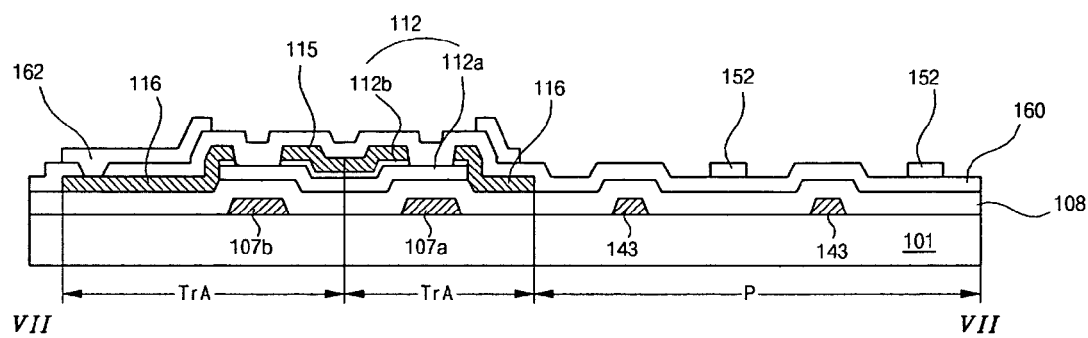
FIG. 8 is a schematic cross-sectional view taken along line "VII-VII" in FIG. 7.

FIG. 8 is a schematic cross-sectional view taken along line "VII-VII" in FIG. 7. Referring to FIG. 8, first and second gate electrodes 107a and 107b are formed in a transistor area "TrA" on a substrate 101. A plurality of common electrodes 143 are formed in a pixel region P on the substrate 101. The first and second gate electrodes 107a and 107b may be portions of first and second gate lines 105a and 105b (shown in FIG. 7), respectively. A gate insulating layer 108 is formed on the first and second gate electrodes 107a and 107b and the plurality of common electrodes 143. A semiconductor layer 112 is formed on the gate insulating layer 108 corresponding to the first and second gate electrodes 107a and 107b. The semiconductor layer 112 includes an active layer 112a and an ohmic contact layer 112b. The active layer 112a includes an intrinsic semiconductor material. The active layer 112a corresponds to the first and second gate electrodes 107a and 107b and to a gap between the first and second gate electrodes 107a and 107b. The ohmic contact layer 112b corresponds to both side portions of each of the gate electrodes 107a and 107b and to the gap between the first and second gate electrodes 107a and 107b.

Source and drain electrodes 115 and 116 spaced apart from each other are formed on the semiconductor layer 112. The source and drain electrodes 115 and 116 contact the ohmic contact layer 112b and overlap both side portions of each of the gate electrodes 107a and 107b. The first and second gate electrodes 107a and 107b, the semiconductor layer 112, the source electrode 115 and the drain electrode 116 form two thin film transistors (TFT), wherein the source electrode 115 commonly belongs to the two TFT. A passivation layer 160 is formed on the source and drain electrodes 115 and 116. The passivation layer 160 has a drain contact hole 162 exposing the drain electrode 116. Not shown in FIG. 8, a plurality of pixel electrodes 152 are connected to each other through a pixel line 150 (shown in FIG. 7). The pixel electrodes 152 are also connected to the drain electrode 116 through the drain contact hole 162. The pixel electrodes 152 alternate with the common electrodes 143 in the pixel region "P."

Figure 9:
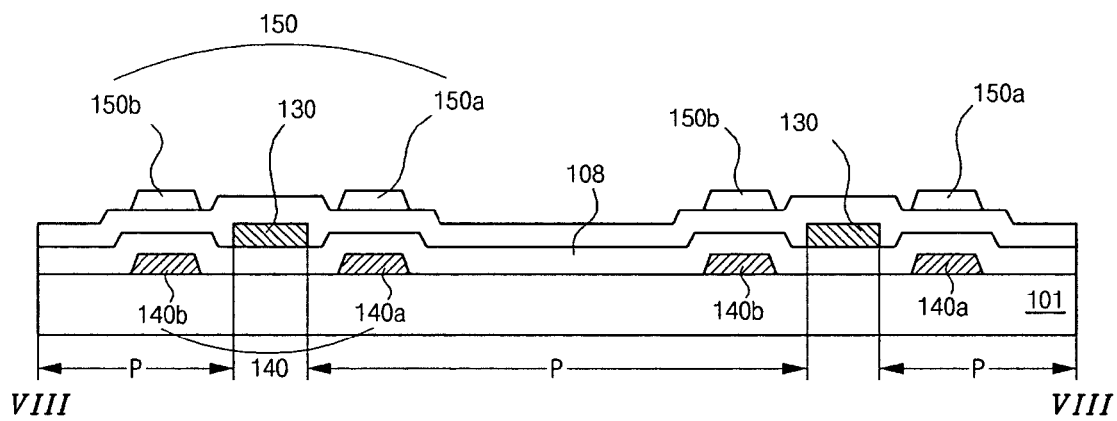
FIG. 9 is a schematic cross-sectional view taken along line "VIII-VIII" in FIG. 7.

FIG. 9 is a schematic cross-sectional view taken along line "VIII-VIII" in FIG. 7. Referring to FIG. 9, an auxiliary common line 140 is formed on a substrate 101 and a gate insulating layer 108 is formed on the auxiliary common line 140. A data line 130 is formed on the gate insulating layer 108. The auxiliary common line 140 can include first and second auxiliary common lines 140a and 140b respectively in adjacent pixel regions "P." The data line 130 can be disposed between the first and second auxiliary common lines 140a and 140b. A passivation layer 160 is formed on the data line 130. A pixel line 150 is formed on the passivation layer 160. The pixel line 150 can include first and second pixel lines 150a and 150b overlapping the first and second auxiliary common lines 140a and 140b, respectively. Although not shown in FIG. 9, the first and second auxiliary common lines 140a and 140b are connected to each other through the common line 120 (shown in FIG. 7).

Figure 1:
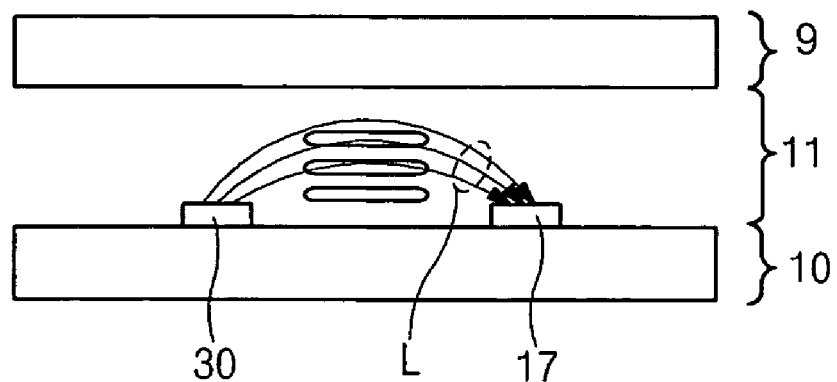
FIG. 1 is a schematic cross-sectional view of an IPS mode LCD device according to the related art.
Figure 2A:
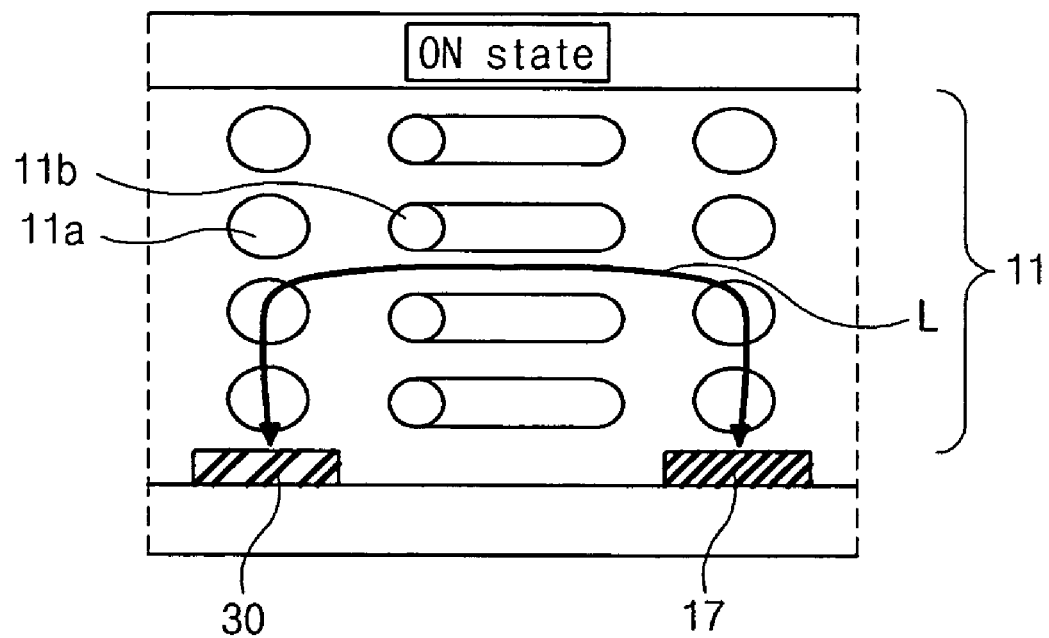
FIG. 2A is a schematic cross-sectional view of the related art in-plane switching mode liquid crystal display device in an ON state.
Figure 2B:
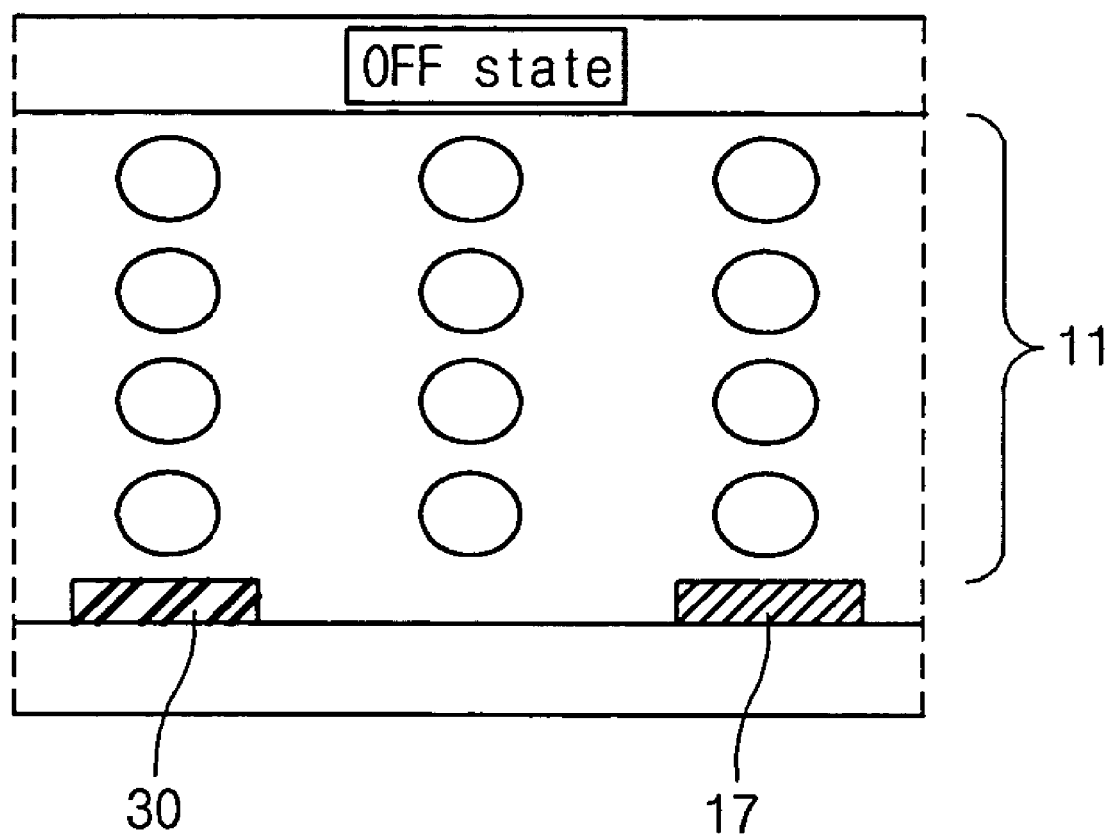
FIG. 2B is a schematic cross-sectional view of the related art in-plane switching mode liquid crystal display device in an OFF state.
Figure 3:
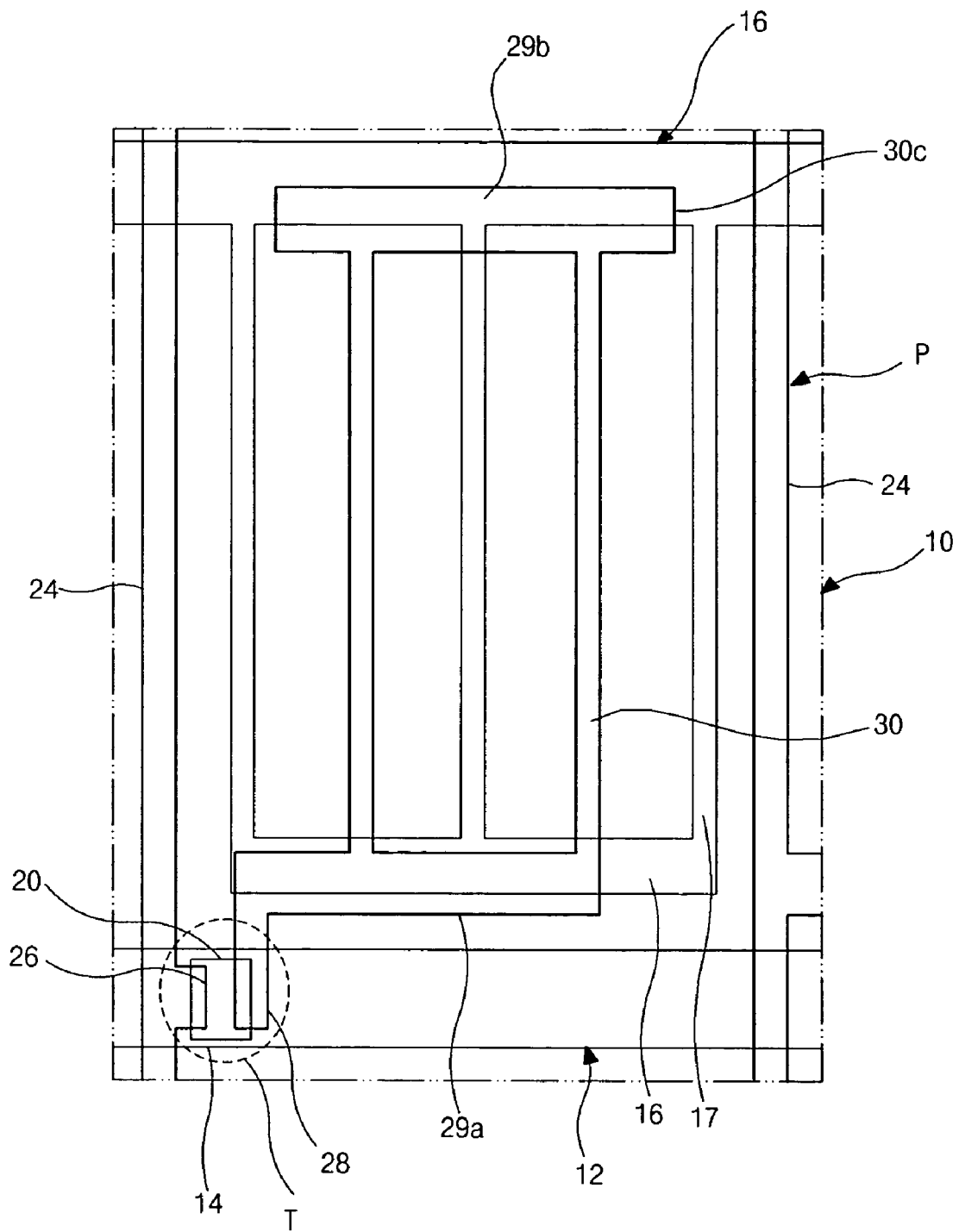
FIG. 3 is a plane view of the related art array substrate for an IPS mode LCD device.
Figure 4:
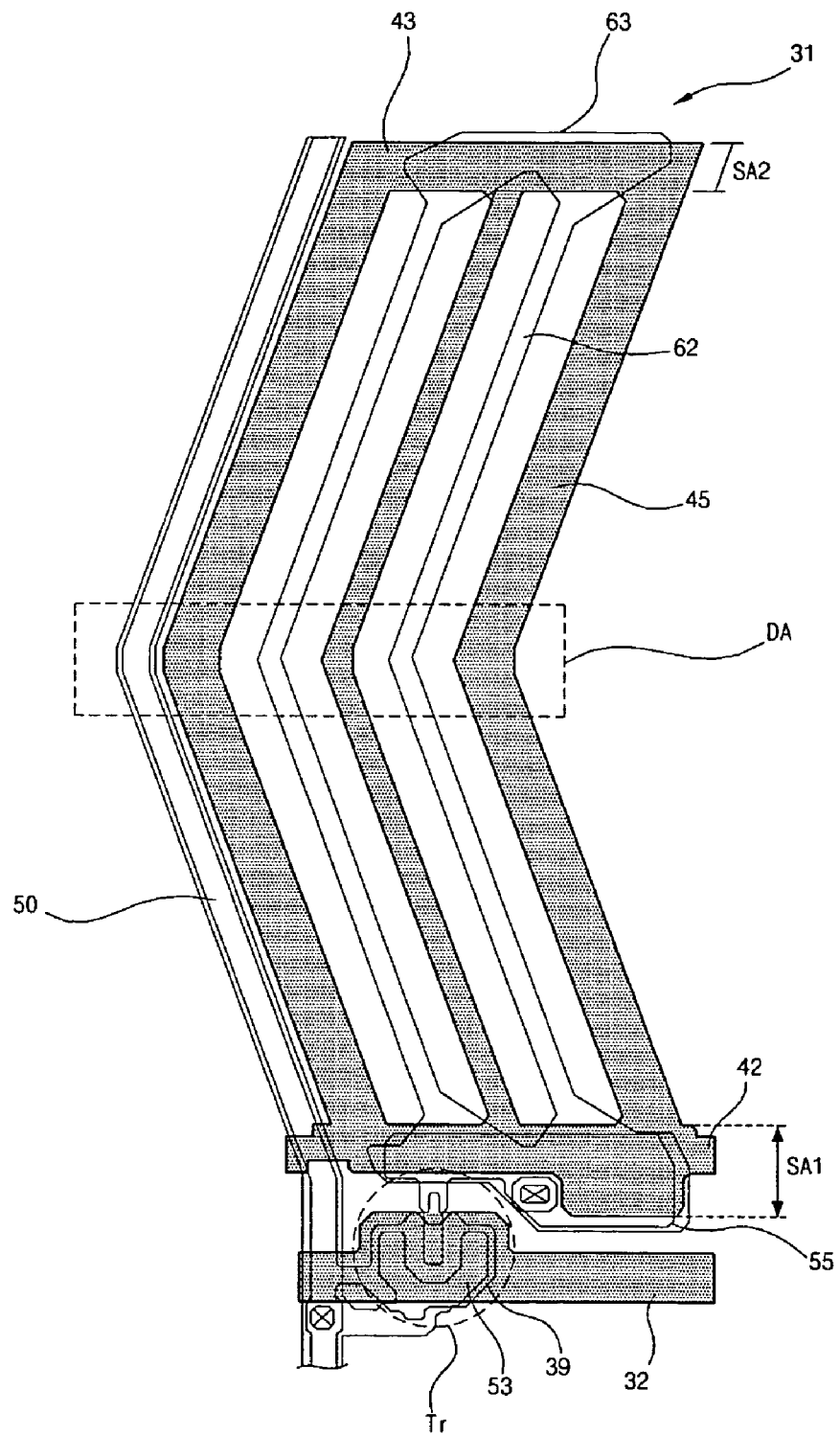
FIG. 4 is a schematic plan view of the related art array substrate for an IPS mode LCD device.
Figure 5:
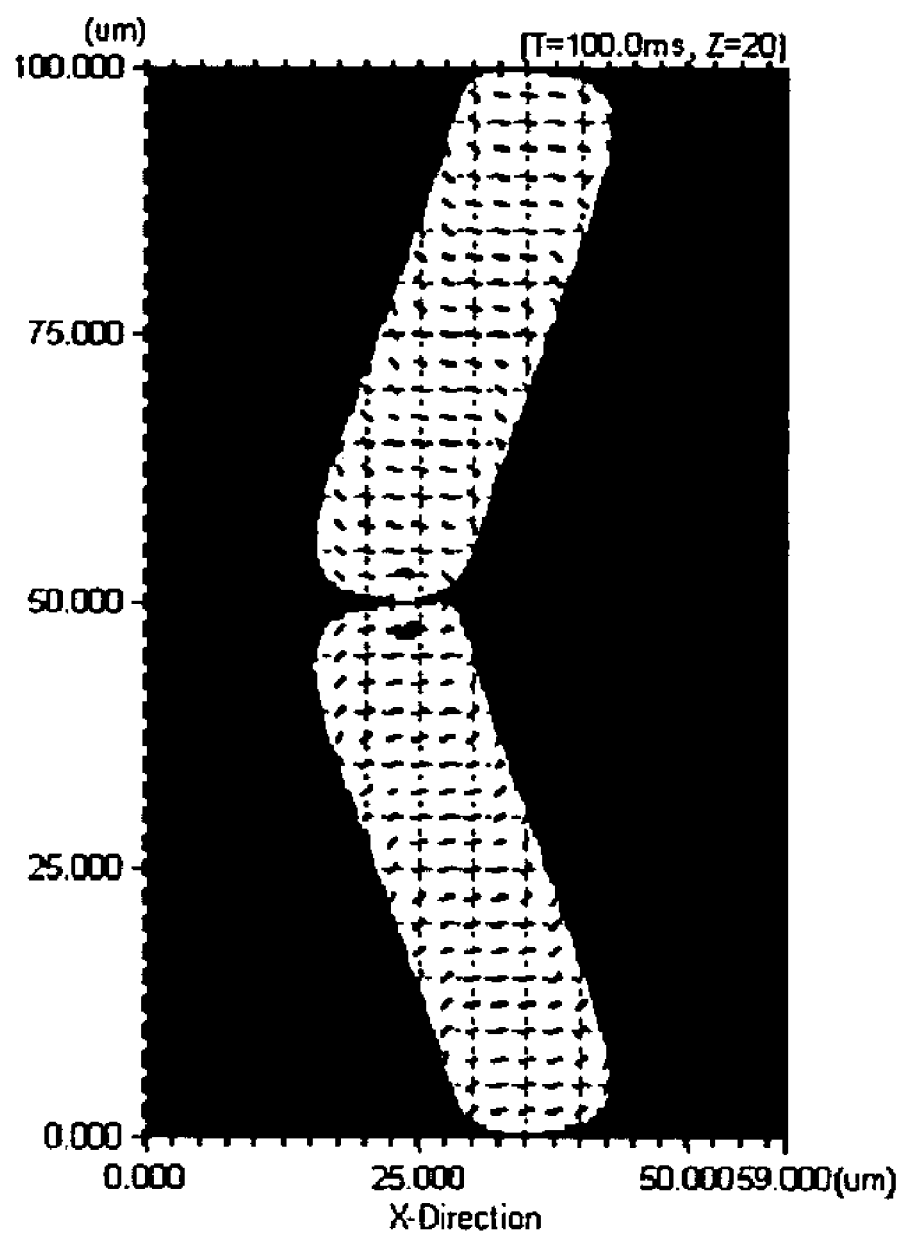
FIG. 5 is a simulation graph showing transmittance in one pixel region of the related art IPS mode LCD device.
Figure 6:
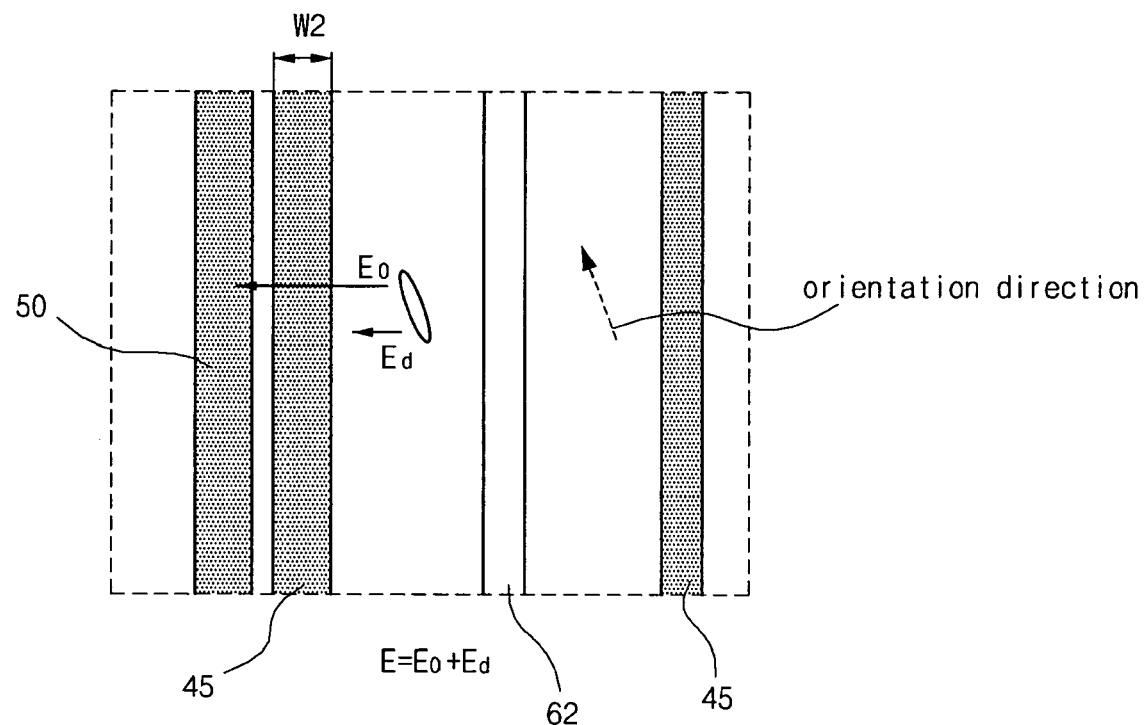
FIG. 6 is a schematic plane view of a data line of the related art IPS mode LCD device.

According to an embodiment of the present invention, an even ($2n^{th}$) gate line and an odd ($2n+1^{th}$) gate line of the IPS mode LCD device are formed as a pair adjacent to each other. Accordingly, additional shielding means, such as first and second shielding means SA1 and SA2 shown in the related art device shown in FIG. 4, are not required. As a result, a shielding area is reduced and the aperture ratio is improved. For example, the shielding area may be reduced to half of the related art shielding area and the aperture ratio may increase by about 2.4%.

Moreover, since a plurality of common electrodes and a plurality of pixel electrodes are disposed horizontally, a common line between an even ($2n^{th}$) pixel region and an odd ($2n+1^{th}$) pixel region is used as a common electrode driving a liquid crystal layer with adjacent pixel electrodes. Accordingly, an even ($2n^{th}$) pixel region and an odd ($2n+1^{th}$) pixel region are disposed closest to each other without an intervening shielding area. As a result, the aperture ratio is further improved.

Furthermore, according to an embodiment of the present invention, a mono-domain structure is formed in one pixel region, and a multi-domain structure is formed over two horizontally adjacent pixel regions in the IPS mode LCD device. Accordingly, an effective transmittance at a borderline between two domains is not reduced, and brightness is improved. A multi-domain structure formed over two adjacent pixel regions is illustrated with reference to a simulation.

TABLE 1 is a simulation result comparing relative aperture ratios of related art IPS mode LCD devices to aperture ratios of an IPS mode LCD device according to an embodiment of the present invention. The related art IPS mode LCD devices have a multi-domain structure over one pixel region, while the IPS mode LCD device according to an embodiment of the present invention has a mono-domain structure in one pixel region.

TABLE 1

| vertical length of pixel region | 40 µm | 50 µm | 60 µm | 70 µm |
|---|---|---|---|---|
| relative aperture ratio of multi-domain structure with respect to aperture ratio of mono-domain structure | 90.2% | 92.2% | 93.5% | 94.4% |
| vertical length of pixel region contributing to the aperture ratio | 36.07 µm | 46.09 µm | 56.10 µm | 66.08 µm |
| vertical length of pixel region used as shielding area | 3.93 µm | 3.91 µm | 3.90 µm | 9.92 µm |

In TABLE 1, one pixel region having a multi-domain structure has a fixed horizontal length and a vertical length varying from 40 µm to 70 µm. The relative aperture ratio is obtained by comparing the aperture ratio of the multi-domain structure formed over the one pixel region with the aperture ratio of a mono-domain structure formed over the pixel region. As shown, the relative aperture ratio is within a range of 90.2% to 94.4%. Accordingly, the vertical lengths of the pixel region contributing to the aperture ratio may be calculated as 36.07 µm, 46.09 µm, 56.10 µm and 66.08 µm, respectively. As a result, the vertical lengths of the pixel region used as shielding areas, i.e., 3.93 µm, 3.91 µm, 3.90 µm and 9.92 µm, respectively, do not contribute to the aperture ratio. An effective area for the aperture ratio is reduced in a multi-domain structure of the pixel region. In a mono-domain structure, the entire area of the pixel region contributes to the aperture ratio because, in the mono-domain structure, the pixel region does not include an inter-domain borderline. Therefore, a pixel region with the mono-domain structure has a higher aperture ratio than the pixel region with the multi-domain structure.

According to an embodiment of the present invention, a multi-domain structure is formed over two pixel regions, and each pixel region has a mono-domain structure. Accordingly, a pixel region does not include an inter-domain borderline. Thus, the aperture ratio is not reduced to account for a borderline. The viewing angle is improved due by the multi-domain structure over two pixel regions and the higher aperture ratio. For example, the aperture ratio may increase by about 1.1% for a pixel region of 300 μm by 100 μm.

In an IPS mode LCD device according to an embodiment of the present invention, a plurality of common electrodes and a plurality of pixel electrodes are disposed perpendicularly to a data line. Thus, an electric field direction between the common electrode and the pixel electrode is different from the direction of the electric field due to the data line. As a result, interference with the electric field from the data line is minimized.

Figure 10:
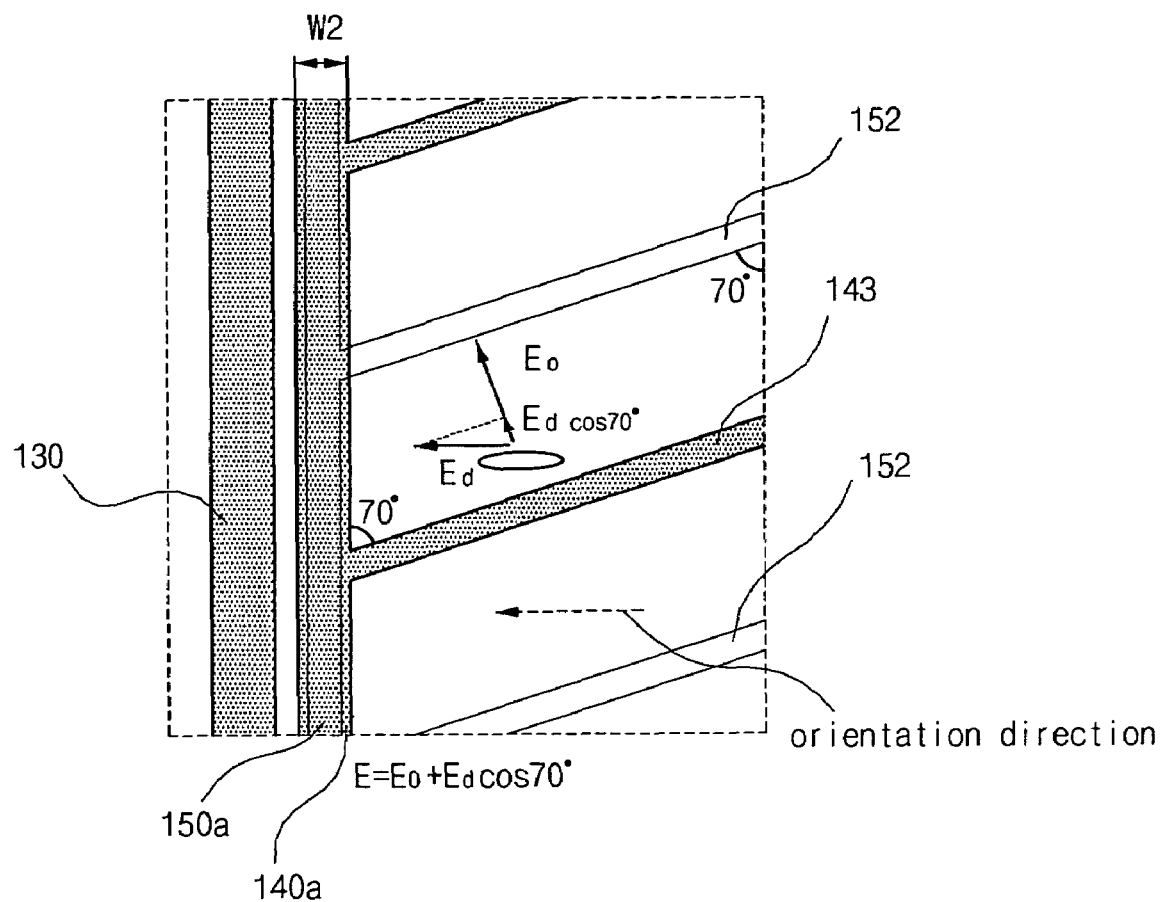
FIG. 10 is a schematic plane view of a data line of an IPS mode LCD device according to an embodiment of the present invention.

FIG. 10 is a schematic plane view of a data line of an IPS mode LCD device according to an embodiment of the present invention. Referring to FIG. 10, a data line 130 is disposed along a vertical direction. An auxiliary common line 140a and a pixel line 150a are spaced apart from and parallel to the data line 130. The auxiliary common line 140a overlaps the pixel line 150a. Common electrodes 143 extending from the auxiliary common line 140a alternate with pixel electrodes 152 extending from the pixel line 150a. In addition, the common electrodes 143 are parallel to the pixel electrodes 152. The common electrodes 143 and the pixel electrodes 152 may extend from the auxiliary common line 140a and the pixel line 150a, respectively, according to an angle of about 70°. An alignment layer for initial orientation of a liquid crystal layer may have an orientation direction having an angle of about 20° with respect to the common electrodes 143 and the pixel electrodes 152. Accordingly, the alignment layer may have an orientation direction perpendicular to the vertical direction. A long axis of a liquid crystal molecule may be aligned with direction of the alignment layer.

When a data signal is applied to the pixel electrodes 152 through the data line 130, a first electric field a first electric field "$E_0$" is generated between the pixel electrode 152 and the common electrode 143 and a second electric field "$E_d$" is generated between the data line 130 and the auxiliary common line 140a. Since the pixel electrode 152 and the common electrode 143 extend from the pixel line 150a and the auxiliary common line 140a, respectively, according to an angle of about 70°, a direction of the first electric field "$E_0$" have an angle of about 20° with respect to the vertical direction. The second electric field "$E_d$" is horizontal. Accordingly, only a cosine factor, that is $E_d$ cos 70°, of the second electric field "$E_d$" contributes to a total electric field "E" driving the liquid crystal layer. The total electric field "E" may be obtained by adding the first electric field "$E_0$" and the cosine factor of the second electric field "$E_d$", that is, $E=E_0+E_d$ cos 70°.

Since an interference of the second electric field "$E_d$" with the total electric field "E" is reduced, the width of the auxiliary common line 140a may be reduced. For example, the auxiliary common line 140a may have a second width "W2" within a range of about 5 μm to about 10 μm. As a result, the aperture ratio is improved by about 6% to about 8%.

In an IPS mode LCD device according to embodiments of the present invention, gate lines are formed in adjacent pairs. Two pixel regions are vertically adjacent to each other with a common line between them. Common electrodes and pixel electrodes horizontally extend from auxiliary common lines and pixel lines, respectively. Accordingly, a shielding area for preventing interference due to the gate lines is reduced. Thus, the width of the auxiliary common line is reduced in accordance with the reduction in interference caused by the electric field between the data line and the common line. Accordingly, the aperture ratio increases. Moreover, since a multi-domain structure is formed over two horizontally adjacent pixel regions, there is no borderline between two domains within one pixel region. Therefore, the transmittance and the aperture ratio are further increased.

It will be apparent to those skilled in the art that various modifications and variations can be made in the IPS mode LCD device and method of fabricating an IPS mode LCD device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
   a substrate;
   a plurality of gate lines on the substrate, the gate lines having a zigzag shape;
   a plurality of first common lines between adjacent pairs of the gate lines, the plurality of first common lines being parallel to the gate lines and having a zigzag shape;
   a plurality of data lines crossing the gate lines and the first common lines to define a plurality of pixel regions;
   a thin film transistor connected to one of the gate lines and one of the data lines;
   a plurality of auxiliary common lines extending from the first common lines, the plurality of auxiliary common lines parallel to the data lines;
   a plurality of common electrodes extending from the plurality of auxiliary common lines, the plurality of common electrodes parallel to the first common lines;
   a plurality of pixel lines connected to the thin film transistor; and
   a plurality of pixel electrodes extending from the plurality of pixel lines, the plurality of pixel electrodes parallel to and alternating with the plurality of common electrodes,
   wherein each of the first common lines extends through the plurality of pixel regions.

2. The device according to claim 1, wherein each of the plurality of gate lines is disposed along a horizontal direction.

3. The device according to claim 1, wherein the first common lines have the same shape as the gate lines.

4. The device according to claim 1, wherein the thin film transistor includes a gate electrode, a semiconductor layer, a source electrode and a drain electrode.

5. The device according to claim 1, wherein the plurality of auxiliary common lines include first and second auxiliary common lines spaced apart from each other in each pixel region.

6. The device according to claim 5, wherein a width of the first and second auxiliary common lines is within a range of about 5 μm to about 10 μm.

7. The device according to claim 5, wherein the common electrodes connect the first auxiliary common lines to the second auxiliary common lines.

8. The device according to claim 5, wherein the plurality of pixel lines includes first and second pixel lines overlapping the first and second auxiliary common lines, respectively.

9. The device according to claim 8, further comprising a passivation layer between the first pixel line and the first auxiliary common line and between the second pixel line and the second auxiliary common line.

10. The device according to claim 1, wherein the plurality of common electrodes and the plurality of pixel electrodes are symmetrical with respect to each data line.

11. The device according to claim 10, wherein an angle between the common electrodes and the data lines in a left pixel region of the data line has the same magnitude as and the opposite direction to an angle between the common electrodes and the data lines in a right pixel region of the data lines.

12. The device according to claim 10, wherein an angle between the pixel electrodes and the data lines in a left pixel region of the data lines has the same magnitude as and the opposite direction to an angle between the pixel electrodes and the data lines in a right pixel region of the data lines.

13. The device according to claim 1, wherein the plurality of gate lines includes first, second and third gate lines, and the plurality of first common lines is disposed between the first and second gate lines, and wherein a first distance between the first and second gate lines is greater than a second distance between the second and third gate lines.

14. The device according to claim 13, wherein a first thin film transistor is connected to second gate line, a second thin film transistor is connected to the third gate line, and the first and second thin film transistors share a source electrode.

15. The device according to claim 1, wherein a distance between the one of the common electrode and an adjacent one of the pixel electrodes is in a range of about 10 µm to about 12 µm.

16. The device according to claim 1, wherein the plurality of gate lines has the same layer as the plurality of common electrodes.

17. A method of fabricating an in-plane switching mode liquid crystal display device, comprising:
    forming a plurality of gate lines, a plurality of first common lines between adjacent pairs of the gate lines, a plurality of auxiliary common lines being parallel to the gate lines and extending from the plurality of first common lines and a plurality of common electrodes extending from the plurality of auxiliary common lines on a substrate, wherein the plurality of gate lines and the plurality of first common lines have a zigzag shape, and the common electrodes are parallel to the first common lines;
    forming a plurality of data lines crossing the plurality of gate lines and the plurality of first common lines to define a plurality of pixel regions, the plurality of data lines parallel to the plurality of auxiliary common lines;
    forming a thin film transistor connected to one of the gate lines and one of the data lines; and
    forming a plurality of pixel lines connected to the thin film transistor and a plurality of pixel electrodes extending from the plurality of pixel lines, wherein the pixel electrodes are parallel to and alternate with the common electrodes,
    wherein each of the first common lines extends through the plurality of pixel regions.

18. The method of claim 17, wherein an angle between the common electrodes and the data lines in a left pixel region of the data line has the same magnitude as and the opposite direction to an angle between the common electrodes and the data lines in a right pixel region of the data lines.

19. The method of claim 17, wherein the plurality of gate lines includes first, second and third gate lines, including disposing the plurality of first common lines between the first and second gate lines, and wherein a first distance between the first and second gate lines is greater than a second distance between the second and third gate lines.

20. The method of claim 19, further comprising connecting a first thin film transistor to the second gate line, connecting a second thin film transistor to the third gate line, and the first and second thin film transistors share a source electrode.

21. An array substrate for an in-plane switching mode liquid crystal display device, comprising:
    a first gate line and a second gate line on a substrate, the first and the second gate lines having a zigzag shape and parallel to each other;
    a first common line between the first and second gate lines, the first common line being parallel to the first and second gate lines and having a zigzag shape;
    a plurality of data lines crossing the first and second gate lines and the first common line to define a plurality of pixel regions;
    a thin film transistor in each of the plurality of pixel regions, the thin film transistor connected to one of the first and second gate lines and one of the data lines
    a plurality of auxiliary common lines in each of the plurality of pixel regions, the plurality of auxiliary common lines extending from the first common lines, the plurality of auxiliary common lines parallel to the data lines;
    a plurality of common electrodes in each of the plurality of pixel regions, the plurality of common electrodes extending from the plurality of auxiliary common lines, the plurality of common electrodes parallel to the first common line; and
    a plurality of pixel lines in each of the plurality of pixel regions, the plurality of pixel lines connected to the thin film transistor, wherein a first slant angle between the common electrodes and the data lines in a pixel region has the same magnitude as and an opposite direction to a second slant angle between the common electrodes and the data lines in an horizontally adjacent pixel region,
    wherein each of the first common lines extends through the plurality of pixel regions.

22. The array substrate of claim 21, further comprising a plurality of pixel electrodes in each of the plurality of pixel regions, the plurality of pixel electrodes extending from the plurality of pixel lines, the plurality of pixel electrodes parallel to and alternating with the plurality of common electrodes.

* * * * *